United States Patent [19]

Langdon

[11] 3,845,719

[45] Nov. 5, 1974

[54] GUIDANCE APPARATUS FOR TRACK FOLLOWING VEHICLES

[75] Inventor: Michael Guy Langdon, Farnham, England

[73] Assignee: British Secretary of State for Environment, London, England

[22] Filed: May 18, 1972

[21] Appl. No.: 254,778

[30] Foreign Application Priority Data
May 21, 1971    Great Britain................... 16183/71

[52] U.S. Cl.................................. 104/130, 104/88
[51] Int. Cl.......................................... E01b 25/26
[58] Field of Search ............ 104/247, 130, 105, 88; 105/154

[56] References Cited
UNITED STATES PATENTS

| 3,593,665 | 7/1971 | Marty | 104/88 |
| 3,628,462 | 12/1971 | Holt | 104/130 |
| 3,650,216 | 3/1972 | Harwick | 104/130 |
| 3,717,102 | 2/1973 | Lott | 104/130 |

Primary Examiner—Robert G. Sheridan
Assistant Examiner—Richard A. Bertsch
Attorney, Agent, or Firm—Elliott I. Pollock

[57] ABSTRACT

Guidance apparatus, for track following vehicles of the kind in which the vehicle is normally guided along the track by a guidance abutment at each side of the track, comprises left hand and right hand guide means for association with corresponding left or right hand secondary track guidance abutments at a fork junction in the track. The guide means are moveable by selector means on the vehicle between a position where the left hand guide means engage a secondary track and the right hand guide means disengage, and a position where the engagement is reversed.

6 Claims, 5 Drawing Figures

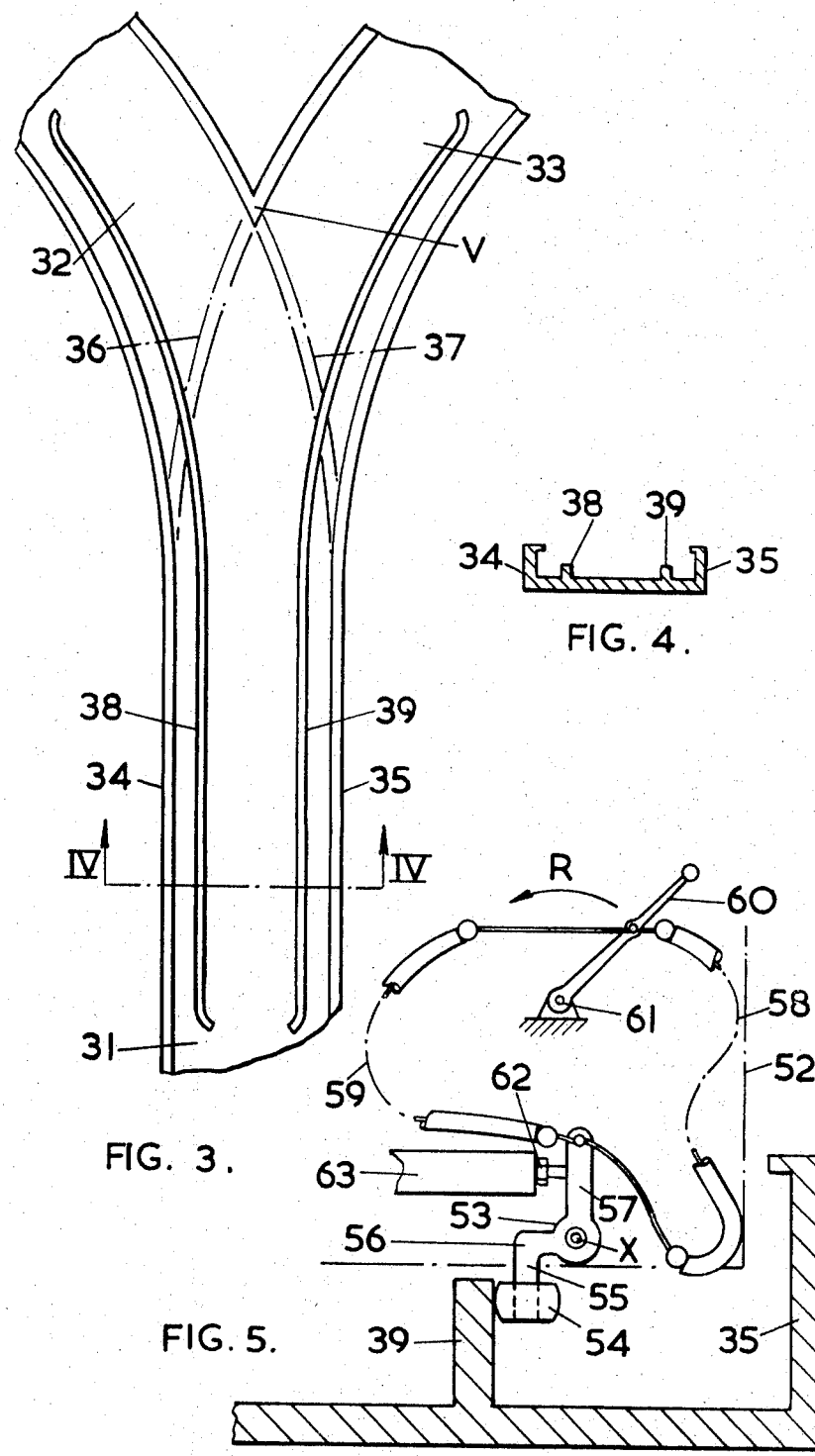

GUIDANCE APPARATUS FOR TRACK FOLLOWING VEHICLES

This invention relates to guidance apparatus for track following vehicles of the kind in which the vehicle is normally guided along the track by a guidance abutment at each side of the track.

With vehicles of this kind difficulty arises at fork junctions in that a discontinuity must be provided in the guidance abutment to enable the vehicle to go right or left as required at the junction.

This means that at a critical point in the junction there is a loss of vehicle guidance from the guidance abutment and alternative guidance means must be provided.

It is an object of the invention to provide improved guidance apparatus for a track following vehicle of the kind referred to.

Guidance apparatus for a vehicle of the kind referred to according to the present invention comprises left and right hand guide means supported for motion on the vehicle and movable by selector means on the vehicle, the one guide means to an engage position and the other to a disengage position, and vice versa, the guide means being adapted to engage corresponding left or right hand secondary track guidance abutments at a fork junction when in the engage position, the engaged abutment acting as a stop to prevent return of the engaging guide means to a disengage position throughout passage of the junction.

In another aspect, the invention comprises the combination of guidance apparatus for a vehicle of the kind referred to as defined above with a track having a guidance abutment at each side of the track except at a fork junction at the outside left and outside right hand edges of the right hand track and left hand track, respectively and having corresponding right and left hand secondary guidance abutments extending throughout and just beyond the length of the junction and adjacent the inside right and left hand guidance abutments, respectively.

The left and right hand guide means are conveniently supported for clockwise and counter-clockwise motion from a disengage to an engage position, respectively about corresponding left and right hand fore and aft vehicle axes.

In a preferred embodiment, adjustable limit stops are provided operable between each guide means and the vehicle for determining the limit of movement of each guide means from the disengage to the engage position.

The selector means may be remotely operable automatically e.g. mechanically or by electronic communication, or may comprise a manually operable control lever on the vehicle.

Thus in a further preferred embodiment the selector means comprises a manually operable control lever which is pivotally supported on the vehicle and is connected by a push-pull cable in a housing control link to each guidance means so that movement of the lever to the left moves the left guide means to an engage position and the right guide means to a disengage position and vice versa.

An embodiment of the invention is illustrated by way of example in the accompanying diagrammatic drawings of which:

FIG. 3 is a plan view of a track junction;

FIG. 4 is a cross section end view on the line IV—IV of FIG. 3, and

FIG. 5 is a detail end view of co-operating parts of the vehicle and track.

Figure 1:
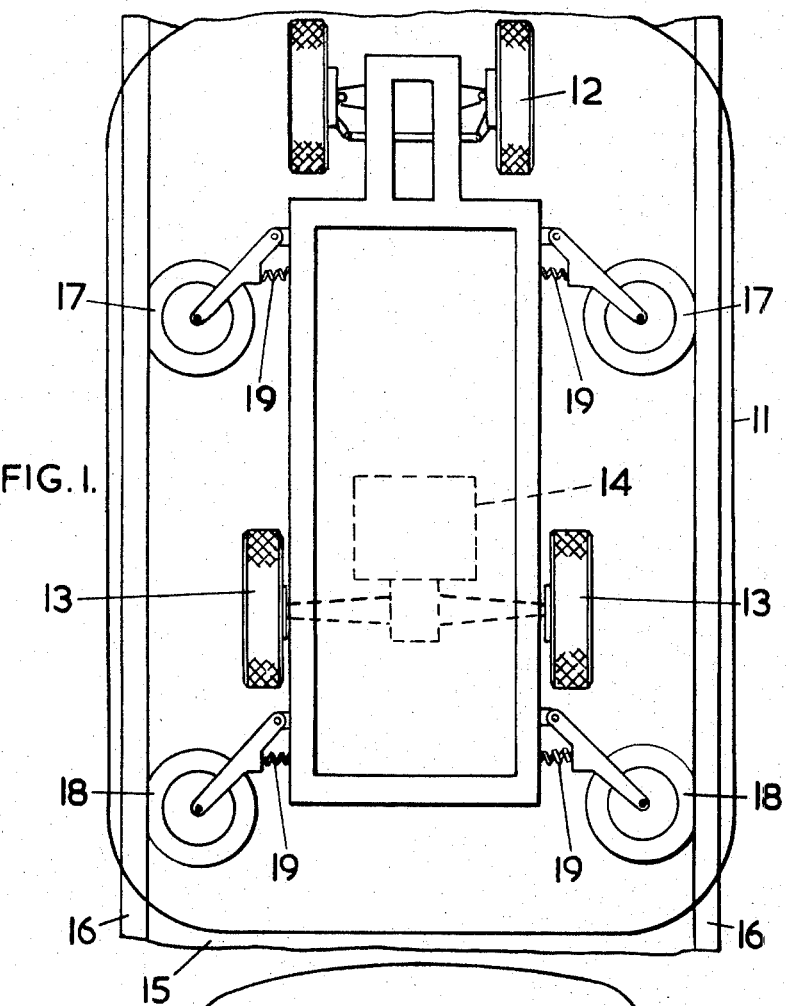
FIGS. 1 and 2 are plan and end elevation views respectively of a vehicle on a track.
Figure 2:
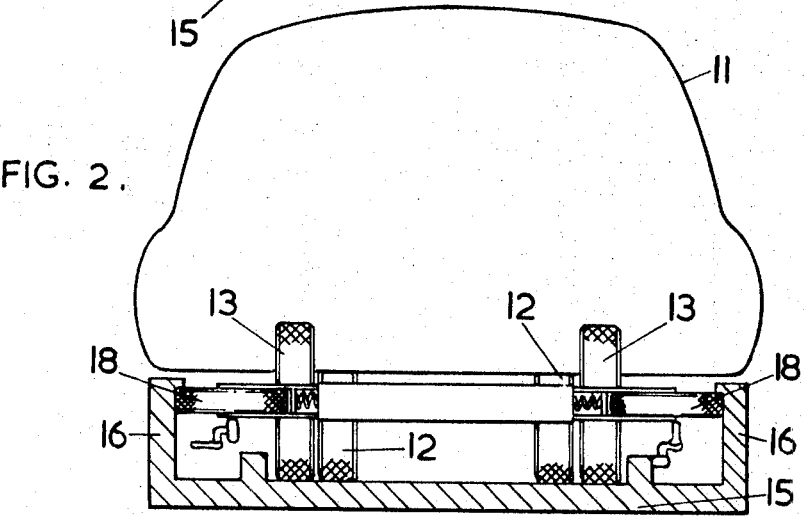

In FIGS. 1 and 2 a track following vehicle 11 has a front and rear pair of support wheels 12, 13 of which the latter are driven by an engine 14 on the vehicle. The vehicle runs on the bottom inner face of a channel track 15 having side walls 16. Front and rear pairs of guide wheels 17, 18 are supported for rotation about vertical axes on the vehicle 11 and are influenced by springs 19 into engagement with the respective side walls 16.

In FIGS. 3 and 4 a track junction is shown for enabling a vehicle such as 11 to be made to go from lead in track 31 left on track 32 or right on track 33. The track junction is passive i.e. it is capable of carrying vehicles either way. The track is of the same type as that shown in FIGS. 1 and 2, and has upstanding side walls 34, 35 similar to 16, 16 thereof. Clearly, to enable a vehicle to go left or right, the right hand outside wall of the left hand track 32 and the left hand outside wall of the right hand track 33 must have discontinuities which are indicated by the dotted sections 36, 37 respectively. This would have the result that, at the critical point as the vehicle comes into the junction region where the walls 34, 35 start to diverge, guidance control from the side walls would be lost because sections 36 and 37 are missing. In this circumstance the vehicle would almost certainly crash into the region V where the tracks 32 and 33 each have two side walls.

To enable this problem to be overcome, left and right hand secondary guidance abutments 38, 39 are provided which extend through and slightly beyond the junction region, which abutments co-operate with corresponding left or right hand guide means carried on the vehicle and which will be described in detail with reference to FIG. 5.

In FIG. 5 part of the right hand side of the track is shown with right hand side wall 35 and secondary guidance abutment 39. Left hand and right hand guide means are supported on the vehicle, part of which is shown at 52, only the right hand guide means being shown at 53. Guide means 53 comprises a roller 54 rotatably mounted on a shaft 55 carried at the end of one arm 56 of a bell crank lever which in turn is pivotally supported on the vehicle for movement about a right hand fore and aft vehicle axis X parallel to the vehicle fore and aft axis. The other arm 57 of the bell crank lever is connected through a push pull cable control connection 58, 59 to a manual control lever 60 pivotally supported on the vehicle about a pivot 61. A stop 62 supported on the arm 57 is adjustable with respect to an abutment 63 on the vehicle.

The left hand guide means (not shown) is similar to 53 but of the other hand, and is also connected to the control lever 60.

In operation, movement of the control lever 60 to the right hand position in which it is shown moves the right hand bell crank lever through 90° counter clockwise about axis X from a dis-engage to an engage position as shown. This movement of the control lever 60 also moves the left hand guide means (not shown) clockwise from an engage to a dis-engage position.

In the engage position where the stop 62 engages the abutment 63, the roller 54 engages the right hand guidance abutment 39, and the left hand guide means is in a dis-engage position. Similarly if lever 60 is moved in the other sense as indicated by arrow R, the left hand guide means roller will engage the left hand guidance abutment 38 and the right hand guide means will be held in a dis-engage position in which it does not engage abutment 39.

Thus, in operation, with a vehicle approaching the junction on lead in track 31, the control lever 60 is set left or right about pivot 61 according to whether the vehicle is required to follow the left hand track 32 or right hand track 33.

It will be seen that, as the vehicle passes through the junction, guidance control of the vehicle is obtained by the reaction of the right hand guide wheels 17, 18 with the right hand side wall 35 and of the right hand guide means 53 with the right hand abutment 39 to make the vehicle go right, or, by the reaction of the left hand guide wheels 17, 18 with the left hand side wall 34 and of the left hand guide means (not shown) with the left hand abutment 38 to make the vehicle go left. Not only is guidance assured, but whichever of the abutments 38 or 39 is operatively engaged by the corresponding left hand or right hand guide means is also operative to prevent the engaged guide means from returning to a disengage position during passage of the juntion. The vehicle is also positively prevented from rolling on its side by the reactions referred to above.

It will be clear that movement of the lever 60 or an equivalent may be obtained manually by an operator on the vehicle or by remote control e.g. electronic communication.

In an alternative arrangement (not illustrated) left and right hand guide rollers, similar to 54 of FIG. 5, are supported on a shaft which is slidable both ways between a left hand position, in which the left hand roller is effective to give locking guidance to make the vehicle follow a left hand track, and a right hand position in which the right hand roller is effective to give locking guidance to make the vehicle follow a right hand track at a junction.

What I claim is:

1. Guidance apparatus for a track-following vehicle normally guided along a track by a guidance abutment at each side of the track, the track having a fork junction dividing it into a left hand track and a right hand track and there being at the fork junction discontinuities in the guidance abutments corresponding to the right hand guidance abutment of the left hand track and the left hand guidance abutment of the right hand track; comprising a left hand guide means and a right hand guide means supported for motion on the vehicle and each movable by selector means comprising a push pull cable in a housing control link connected to each of said guide means and connected to a control lever pivotally supported on the vehicle, movement of the control lever to the left being operative to move said left and right hand guide means clockwise about left and right hand fore and aft vehicle axes respectively into positions where said left hand guide means engage a left hand secondary guidance abutment leading into said left hand track and said right hand guide means are disengaged, and movement of the control lever to the right being operative to move said left and right hand guide means counter-clockwise about said fore and aft vehicle axes into positions where said right hand guide means engage a right hand secondary guidance abutment leading into said right hand track and said left hand guide means are disengaged, engagement of a guide means with a secondary guidance abutment acting as a stop to prevent return of that guide means to disengage position throughout passage of the fork junction.

2. Guidance apparatus as claimed in claim 1 further comprising adjustable limit stops for determining the limit of movement of each guide means from the disengaged to the engaged position.

3. Guidance apparatus as claimed in claim 1 wherein said selector means are automatically operable by remote control.

4. Guidance apparatus as claimed in claim 1 wherein said selector means are manually operable.

5. Guidance apparatus as claimed in claim 4 wherein each guide means comprises a roller rotatably mounted on a shaft, said shaft being carried at a first end of a bell crank lever, said bell crank lever being pivotally mounted on the vehicle for movement about a fore and aft axis parallel to the vehicle fore and aft axis; said selector means comprising a manual control lever connected by said push pull cable to a second end of each of said bell crank levers; and further comprising an adjustable limit stop for each of said guide means; said manual control lever being pivotable between a position where said bell crank lever of said left hand guide means contacts said adjustable limit stop with its roller in an engage position and a position where said bell crank lever of said right hand guide means contacts said adjustable limit stop with its roller in an engage position.

6. Guidance apparatus as claimed in claim 1 wherein each guide means comprises a roller rotatably mounted on a shaft, said shaft being carried at a first end of a bell crank lever, said control lever being connected by said push pull cable to a second end of each of said bell crank levers.

* * * * *